Sept. 7, 1926.
A. B. ROGERS
AUTOMATIC SIGN EXHIBITOR
Filed Feb. 23, 1926    2 Sheets-Sheet 1
1,598,658
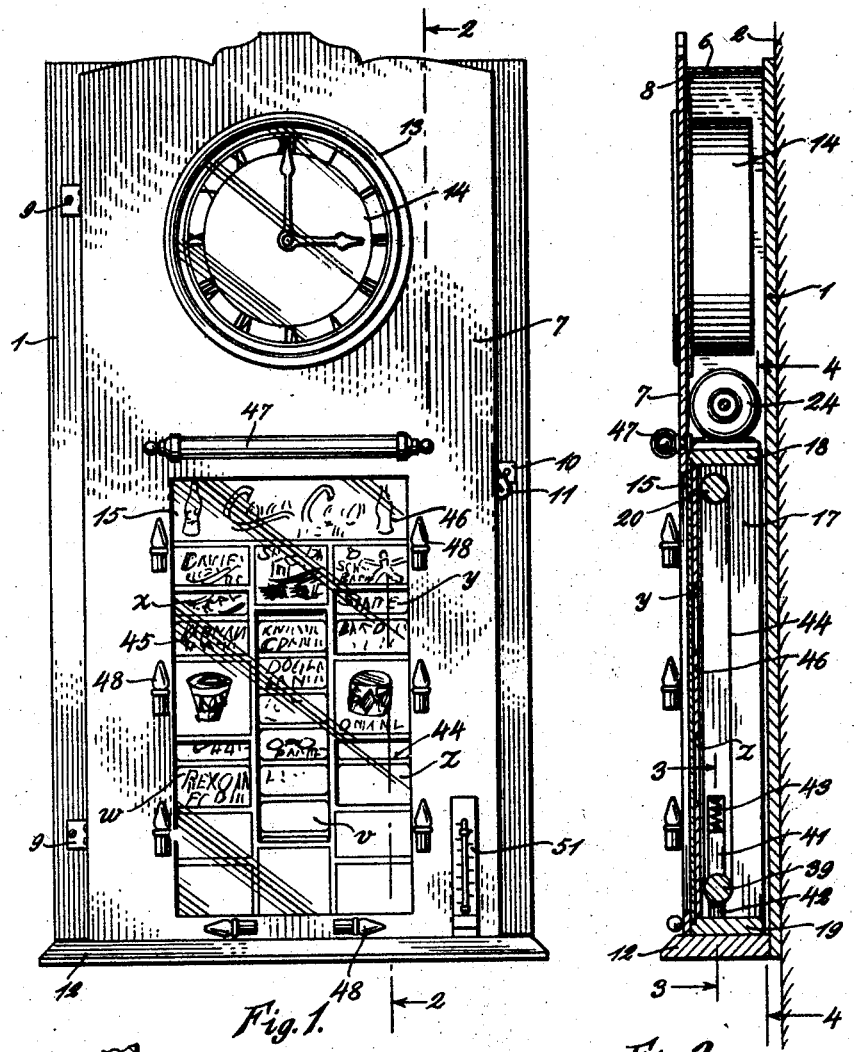
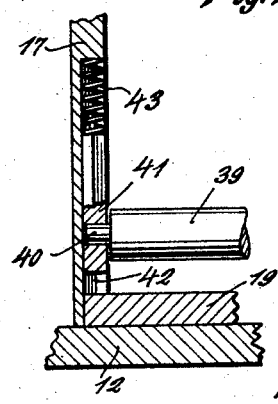
Inventor
Arthur B. Rogers.
By
Attorney Sept. 7, 1926.  1,598,658
A. B. ROGERS
AUTOMATIC SIGN EXHIBITOR
Filed Feb. 23, 1926   2 Sheets-Sheet 2

Inventor
Arthur B. Rogers.
By
Attorney

Patented Sept. 7, 1926.

1,598,658

UNITED STATES PATENT OFFICE.

ARTHUR B. ROGERS, OF GREELEY, COLORADO.

AUTOMATIC SIGN EXHIBITOR.

Application filed February 23, 1926. Serial No. 89,882.

This invention relates to improvements in devices for displaying advertisements, of the type sometimes referred to as changeable sign exhibitors.

In advertising for the purpose of increasing sales or improving business, it is essential that the advertisements shall be so displayed that they will attract the attention of the public for if an advertisement is not noticed and read it will be of no value.

It is well recognized by advertisers that ordinary small advertisements in papers and magazines have lost their value, for the general public are far too busy to read anything but what is essential for the purpose of their calling and for general information. In order to make an advertisement effective, it is therefore necessary to put it before the public in such a manner that it will attract their attention to the extent that they will take notice of it and then the advertisement must be so attractive and concise that it will arouse the interest of the observer to the extent that he will read and make a mental memorandum of it.

It has been found that nothing will attract attention as much as motion and lights. When it is desired to attract attention to an advertisement on or the other or both of these expedients are resorted to.

In the device which forms the subject matter of this invention, applicant has taken advantage of the attractive force of light, motion and beauty of appearance so that any one coming within sight of the sign will be drawn towards it and have his curiosity aroused to such an extent that he will read the various advertisements exhibited thereon. The above and other objects that may become apparent as the description proceeds are attained by means of a construction and arrangement of parts that will now be described in detail, reference for this purpose being had to the accompanying drawings on which the preferred embodiment of my invention has been shown and in which:

Fig. 1 is a front elevation of the improved sign exhibitor;

Fig. 2 is a section taken on line 2—2, Fig. 1;

Fig. 3 is a section taken on line 3—3, Fig. 2;

Figure 4:
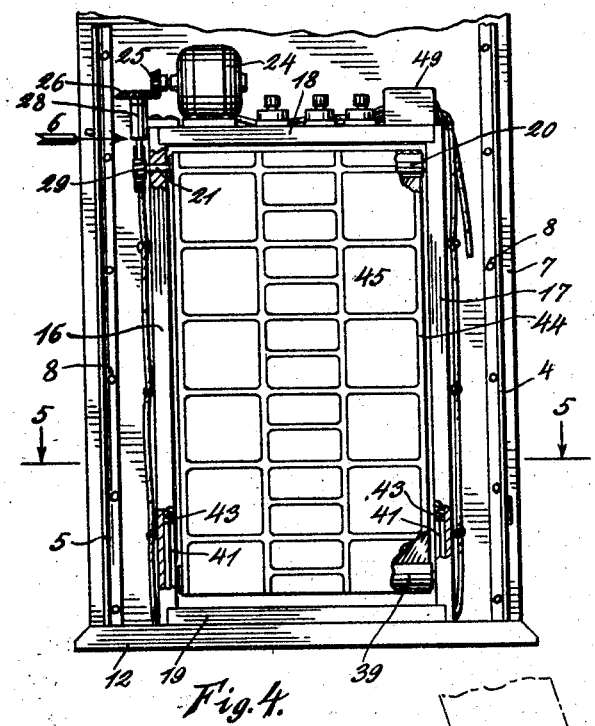
Fig. 4 is a section taken on line 4—4, Fig. 2.
Figure 6:
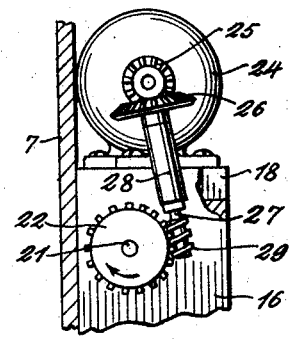
Fig. 6 is a view looking in the direction of the arrow 6 in Fig. 4.
Figure 5:
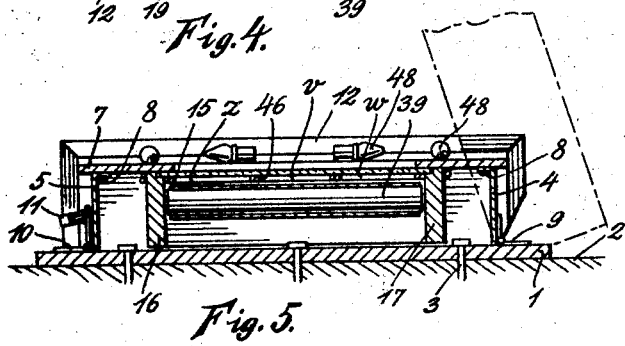
Fig. 5 is a section taken on line 5—5, Fig. 4.
Figure 7:
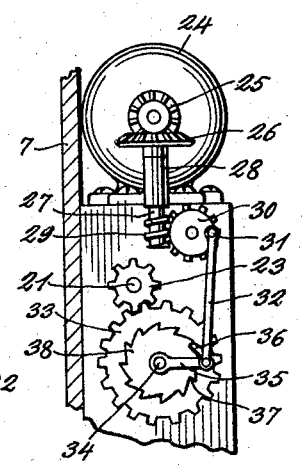
Fig. 7 is a view similar to that shown in Fig. 6 but showing an intermittent mechanism for operating the sign carrying belt.
Figure 8:
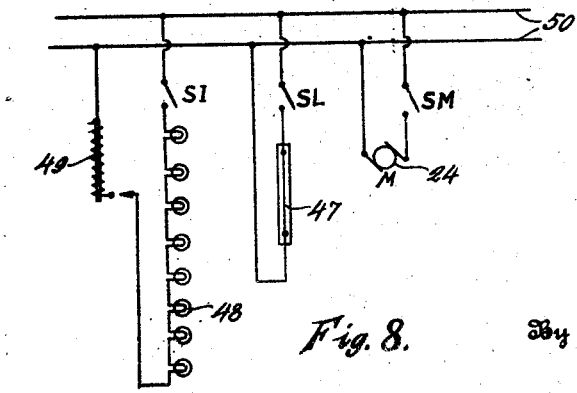
Fig. 8 is a diagram of the wiring.

In the device forming the subject matter of this invention numeral 1 represents a board or plate that is intended to be secured to the front face of a wall 2 by means of bolts 3 or other suitable attaching devices. Secured to the face of the board 1 is a box or casing having metal sides 4 and 5 and a transverse top wall 6. A flat sheet 7 of metal, wood or other suitable material is secured to the front inwardly bent edges of the members 4, 5 and 6 by screws 8. Hinges 9 have parts secured to the side 4 and corresponding parts secured to the board 1 so that the casing may be swung about the hinge pins from the position shown by full lines to the dotted line position shown in Fig. 5. When the casing is in normal or closed position (shown by full lines in Fig. 5) it may be locked in such position by means of a hasp 10 and a padlock 11 or by some equivalent locking means. The lower end of the casing is closed by a base member 12. The plate 7 has two openings of considerable size, one of which is circular and has been indicated by numeral 13 and in which a clock 14 is located. The other opening 15 is rectangular. Surrounding the opening 15 on the rear of the plate 7 is a frame consisting of sides 16 and 17 a top member 18 and a base member 19. A roller 20 has its ends rotatably mounted in the sides 16 and 17 and has one end provided with a journal 21 that extends entirely through the side 16 and to which is secured a worm gear 22 (Fig. 6) or an ordinary gear wheel 23 (Fig. 7), as the case may be. Secured to the upper transverse member 18 is a motor 24 to one end of whose shaft a bevel gear 25 is connected; this gear cooperates with a similar gear 26 on the upper end of a shaft 27. The shaft 27 is journaled in a bearing 28 and carries secured to its lower end a worm 29 that cooperates with the worm gear 22 for the purpose of rotating it in the direction of the arrow (Fig. 6). Where an intermittent or step by step rotation of the roller 20 is desired, the mechanism illustrated in Fig. 7 or some equivalent means may be used. In Fig. 7 the worm 29 has been shown in engagement with a worm wheel 30 that carries a crank pin 31 to which one end of the connecting rod 32 is connected. A large gear 33 meshes with the pinion 23 and is rotatable about the pivot 34. An arm 35 has one end connected with the pivot 34 and carries a pawl 36 that is adapted to engage the ratchet teeth 37. The lower end of the connecting rod 32 is pivotally attached to the arm 35. The ratchet wheel 38 is fastened to the gear 33 so that the two will rotate together. When the motor rotates the arm 35 will be caused to oscillate and will rotate the gears 33 and 23 when moving upwardly, on the downward movement of the arm 35, however, these gears will stand still. A second roller 39 is provided at each end with a trunnion 40, each of which is rotatably connected with a slidable bearing block 41, one of which is mounted in a recess 42 in each of the side members 16 and 17. A spring 43 is located in the recess 42 between the upper end of the recess and the upper end of the block 41 and tends to move the roller 39 away from the roller 20. Enclosing the rollers 20 and 39 is an endless belt 44 of some suitable fabric such as paper or cloth whose outer surface is marked off into rectangles such as shown in Fig. 4 and designated by numeral 45. These rectangles may be of various sizes and on the surface of each an advertisement or sign of some kind may be painted. If the opening 15 were entirely uncovered, the whole of the front surface of the belt 44 would be exposed but since this would produce a device having an unattractive appearance this opening is closed by a sheet 46 of opaque material which is provided with a number of openings which have been designated as v, w, x, y and z through which the face of the belt will be visible. The other parts of the exposed surface of the member 46 is divided into rectangular spaces on which advertisements or signs are painted. When the motor 24 operates the belt 44 is moved upwardly and the signs or advertisements on its surface will pass before the openings in the member 46 so that they may be read. If the mechanism shown in Fig. 7 is employed the belt 44 will move intermittently and the motion may be so related to the size of the rectangular spaces that a new advertisement will be brought into view at each rotation of the wheel 30.

For the purpose of illumination an incandescent lamp 47 is located at the top of the opening 15 and other and smaller lamps 48 are located about the opening and are connected in series with each other and with a thermally operated make and break device 49 so that they will flash. The motor, the lamp 47 and the lamps 48 each derive their power from the supply circuit 50 and are controlled respectively by switches SM, SL and S. A thermometer 51 may be secured to the front surface of the device in the manner shown in Fig. 1. The wires, switches and all of the mechanism all enclosed in the casing and are made accessible only by unlocking the hasp and rotating the case about the hinge pins to the dotted line position shown in Fig. 5.

Having now described the invention what is claimed as new is:

1. A changeable sign exhibitor comprising, in combination, a casing having a front side provided with an opening, a thin member of opaque material extending across said opening, said opaque member having a plurality of openings arranged in separate vertical rows, the spaces between said openings being provided on the outer surface with signs, a frame surrounding the opening in the front side, a roller rotatably secured to the frame at a point above the upper edge of said opening, a similar roller rotatably secured at its ends to members slidably connected with the frame at a point near the lower end thereof, means comprising springs for producing a force tending to move the slidable end members downwardly, an endless belt encircling said rollers and held under tension by said spring means, the outer surface of the belt being provided with rows of longitudinally extending spaces adapted to have signs painted thereon, and means comprising an electrical motor for moving the belt so as to bring different portions thereof into register with the openings in the opaque member.

2. A changeable sign exhibitor comprising, in combination, a casing having a front side provided with an opening, a thin member of opaque material extending across said opening, said opaque member having a plurality of openings arranged in separate vertical rows, the spaces between said openings being provided on the outer surface with signs, a frame surrounding the opening in the front side, a roller rotatably secured to the frame at a point above the upper edge of said opening, a similar roller rotatably secured at its ends to members slidably connected with the frame at a point near the lower end thereof, means comprising springs for producing a force tending to move the slidable end members downwardly, an endless belt encircling said rollers and held under tension by said spring means, the outer surface of the belt being provided with rows of longitudinally extending spaces adapted to have signs painted thereon, and means comprising an electrical motor for moving the belt so as to bring different portions thereof into register with the openings in the opaque member, said means comprising a motion transmitting device including a worm gear.

3. A changeable sign exhibitor comprising, in combination, a casing having a front side provided with an opening, a thin member of opaque material extending across said opening, said opaque member having a plurality of openings arranged in separate vertical rows, the spaces between said openings being provided on the outer surface with signs, a frame surrounding the opening in the front side, a roller rotatably secured to the frame at a point above the upper edge of said opening, a similar roller rotatably secured at its ends to members slidably connected with the frame at a point near the lower end thereof, means comprising springs for producing a force tending to move the slidable end members downwardly, an endless belt encircling said rollers and held under tension by said spring means, the outer surface of the belt being provided with rows of longitudinally extending spaces adapted to have signs painted thereon, and means comprising an electrical motor for imparting to said belt an intermittent motion so as to move the belt by equal step into position in which the signs on the belt register with the openings in the opaque member.

4. A changeable sign exhibitor comprising, in combination, a casing having a front side provided with an opening, a thin member of opaque material extending across said opening, said opaque member having a plurality of openings arranged in separate vertical rows, the spaces between said openings being provided on the outer surface with signs, a frame surrounding the opening in the front side, a roller rotatably secured to the frame at a point above the upper end of said opening, a similar roller rotatably secured at its ends to members slidably connected with the frame at a point near the lower end thereof, means comprising springs for producing a force tending to move the slidable end members downwardly, an endless belt encircling said rollers and held under tension by said spring means, the outer surface of the belt being provided with rows of longitudinally extending spaces adapted to have signs painted thereon, means comprising an electrical motor for moving the belt so as to bring different portions thereof into register with the openings in the opaque member and means for illuminating the face of the device.

5. A changeable sign exhibitor comprising, in combination, a casing having a front side provided with an opening, a thin member of opaque material extending across said opening, said opaque member having a plurality of openings arranged in separate vertical rows, the spaces between said openings being provided on the outer surface with signs, a frame surrounding the opening in the front side, a roller rotatably secured to the frame at a point above the upper end of said opening, a similar roller rotatably secured at its ends to members slidably connected with the frame at a point near the lower end thereof, means comprising springs for producing a force tending to move the slidable end members downwardly, an endless belt encircling said rollers and held under tension by said spring means, the outer surface of the belt being provided with rows of longitudinally extending spaces adapted to have signs painted thereon, means comprising an electrical motor for moving the belt so as to bring different portions thereof into register with the openings in the opaque member and means for illuminating the face of the device, said means comprising an interrupted light.

In testimony whereof I affix my signature.

ARTHUR B. ROGERS.